US008128120B2

(12) United States Patent
Porcheron

(10) Patent No.: US 8,128,120 B2

(45) Date of Patent: Mar. 6, 2012

(54) MULTI-POSITION WHEELCHAIR FOR HANDICAPPED PEOPLE

(75) Inventor: Francois Porcheron, Les Echets (FR)

(73) Assignee: Lifestand "Vivre Debout", Les Echets (FR)

( * ) Notice: Subject to any disclaimer, the term of this patent is extended or adjusted under 35 U.S.C. 154(b) by 508 days.

(21) Appl. No.: 12/225,866

(22) PCT Filed: Apr. 3, 2006

(86) PCT No.: PCT/FR2006/050288

§ 371 (c)(1),
(2), (4) Date: Apr. 17, 2009

(87) PCT Pub. No.: WO2007/113395

PCT Pub. Date: Oct. 11, 2007

(65) Prior Publication Data

US 2009/0218784 A1 Sep. 3, 2009

(51) Int. Cl.
*B62B 3/02* (2006.01)

(52) U.S. Cl. ........ 280/657; 280/647; 180/65.1; 180/907

(58) Field of Classification Search ............... 280/250.1, 280/304.1, 650, 647, 657, 47.38; 180/65.1, 180/907

See application file for complete search history.

(56) References Cited

U.S. PATENT DOCUMENTS

| | | | | | |
|---|---|---|---|---|---|
| 4,312,500 | A | * | 1/1982 | Janssen | 5/618 |
| 4,456,086 | A | * | 6/1984 | Wier et al. | 180/11 |
| 5,366,036 | A | * | 11/1994 | Perry | 180/65.1 |
| 6,154,690 | A | * | 11/2000 | Coleman | 701/1 |
| 6,601,869 | B2 | * | 8/2003 | Porcheron | 280/648 |
| 6,773,032 | B2 | * | 8/2004 | Redman et al. | 280/755 |
| 7,708,093 | B1 | * | 5/2010 | Baker | 180/65.1 |
| 7,815,209 | B2 | * | 10/2010 | Porcheron | 280/304.1 |
| 2003/0227161 | A1 | | 12/2003 | Redman et al. | |

FOREIGN PATENT DOCUMENTS

| | | |
|---|---|---|
| DE | 299 22 994 | 4/2000 |
| EP | 0 373 245 | 6/1990 |
| WO | 92/15271 | 9/1992 |

* cited by examiner

*Primary Examiner* — John Walters

(74) *Attorney, Agent, or Firm* — Clark & Brody

(57) ABSTRACT

According to the invention, the wheelchair is characterized in that it includes means to incline the whole seat structure, and inclining means that are interposed between the chassis and the lifting means and that include at least:

a base (65) that is attached to the chassis (1) and that oscillates around a more-or-less horizontal axis, and on which the lifting means are fitted, and a mechanical assistance means that is interposed between the base (65) and the chassis (1) and that is designed to allow modification of the slope of the whole seat structure by rotation of the base (65).

13 Claims, 5 Drawing Sheets

MULTI-POSITION WHEELCHAIR FOR HANDICAPPED PEOPLE

The invention concerns the technical field of the multi-position seating for handicapped people allowing a user to pass, for example, from a low seated position to a high seated position.

In one application, which is preferred but not exclusive, the invention concerns the field of wheelchairs for handicapped people or those with reduced mobility, which include lifting means that are used to raise the user placed on the seat, so as to allow him (or her), for example, to reach objects positioned high up, while still remaining seated.

In the aforementioned field, international application WO 92/15271, proposes, for example, a wheelchair for handicapped people, with a support chassis on wheels. The wheelchair is also equipped in a conventional manner with a seat structure that includes at least one footrest, a seat and a seat back. The wheelchair finally includes lifting means, interposed between the chassis and the seat structure, to allow modification of the height of the seat structure.

According to application WO 92/15271, to this end, the lifting means include an articulated assembly composed firstly, of a parallelogram that is deformable in a vertical plane, interposed between the chassis and the seat structure and, secondly, of a mechanical assistance means designed to allow a change in the seat height by deformation of the parallelogram.

Such a wheelchair completely fulfils its function of raising and lowering the user. However, it emerged that such a wheelchair was not capable of allowing easily changing the slope or of the general trim of the seat structure in order, for example, to cause the seat structure to adopt a position inclined toward the rear and allow the wheelchair user to relax, while also reducing the pressure on the lower back and the buttocks in order to reduce the risk of causing ulceration and the effects of shear stress due to the changes of position.

The invention aims to remedy this drawback by proposing means to incline the whole seat structure so as to allow a change in the general slope or trim of the latter, in a simple manner, with no profound change in the design of the wheelchair. In order to reach this objective, the invention therefore concerns a wheelchair for handicapped people or people of reduced mobility that includes:

- a support chassis,
- a seat structure that includes at least:
  - a footrest,
  - a seat,
  - a seat back,
- and lifting means, interposed between the chassis and the seat structure, allowing a change in the height of the seat structure.

According to the invention, this wheelchair is characterized in that it includes means to incline the whole seat structure, inclining means that are interposed between the chassis and the seat structure and that include at least the following:

- a base, attached to the chassis, which oscillates around a more-or-less horizontal axis, and onto which the lifting means are fitted, and
- mechanical assistance means, interposed between the base and the chassis, and that are designed, by rotation of the base, to allow a change in the slope of the whole seat structure, independently of its configuration.

According to the invention, the wheelchair is also characterized in that the lifting means include at least:

- an articulated assembly that has at least one polygon that is deformable in a vertical plane, interposed between the seat structure and the base, which then forms one side of the deformable polygon,
- and a mechanical assistance means, designed, by deformation of the polygon, to allow a change in the height of the seat structure.

Thus, the implementation of the base associated with the mechanical assistance means allows the general slope of the seat structure to be changed very simply, independently of the configuration adopted for the latter and, in particular, while also being able to preserve the desired seat height.

According to the invention, the mechanical assistance part of the inclining means can be created in any appropriate manner and, for example, can include a manually maneuvered system, such as a screw-type jack for example, driven by means of a wheel fitted with a crank or, in a preferred manner, can be motor-driven, being made, for example, in the form of an electrical actuator interposed between the base and the chassis.

According to the invention, in order to ensure greater stability of the seat structure in relation to the chassis, the articulated assembly of the elevation means includes at least two polygons that are deformable in two parallel vertical planes.

According to the invention, it is possible to adopt several shapes for the deformable polygons but, in a preferred manner, these deformable polygons are quadrilaterals that will be chosen, in a manner that is advantageous but not strictly necessary, to be parallelograms.

In a form that is preferred but not strictly necessary to create the wheelchair of the invention, the latter is designed so as to form what could be called a multi-position wheelchair and the seat structure is then chosen to be articulated.

To this end, the seat structure includes:

- support structures for the seat back, for the seat, and for the footrest, which are articulated in order to allow a change in the relative slope of the seat back in relation to the seat, and/or a change in the relative slope of the footrest in relation to the seat,
- and at least one mechanical assistance means, designed to ensure a change in the relative slope or the relative angle of the seat back in relation to the seat, and/or a change in the relative slope or the relative angle of the footrest in relation to the seat.

Such an articulated seat structure allows one, for example by the modifying the slope in relation to the seat, firstly, of the seat back and, secondly, of the footrest, to make it possible to place the seat structure in an extended position by, for example, placing the footrest, the seat and the seat back, in extension in relation to each other, in a more-or-less horizontal plane.

Likewise, it is possible to place the articulated seat structure in a relaxation position.

In the extended configuration, for example, the means for inclining or changing the general slope of the seat structure can be used very advantageously to place the seat structure in a position inclined toward the front, or indeed inclined toward the rear. Thus, it is possible to place the wheelchair user prone in a head down position, in order to apply the technique of respiratory physiotherapy called “back clapping” or assisted expectoration.

The combination of the articulated character of the seat structure and the inclining means of the latter allows one to place the wheelchair of the invention in a large variety of configurations, designed to meet the medical needs of the wheelchair user.

In a form that is yet more particularly preferred, the seat structure and the mechanical assistance means are fitted so as to allow the passage of the seat structure into a "verticalisation" position, in which the footrest, the seat, and the seat back are placed in extension in relation to each other, in a more-or-less vertical plane.

Here again, the combination of the articulated character of the seat structure and the implementation of the inclining means of the latter, allow one, when the user is in a virtualization position, to adopt a slight slope toward the rear of the verticals seat structure, so as to provide the user with a feeling of security.

According to the invention, the seat structure can also be designed so as to allow, firstly, the passage of the seat structure into a virtualization position and, secondly, the passage of this same seat structure into the position referred to as "extended".

According to another characteristic of the invention, the seat back arm is formed by a motor-driven actuator that constitutes a mechanical assistance means for modifying the relative slope of the seat back in relation to the seat.

In the same sense, according to a characteristic of the invention, the leg-support arm is formed by a motor-driven actuator that constitutes a mechanical assistance means for modifying the relative slope of the footrest in relation to the seat.

In a preferred manner, the wheelchair of the invention is intended to allow a change of position of the user and, to this end; it takes the form of a wheelchair whose chassis includes at least three wheels. In order to make the user fully independent, at least one of the wheels will preferably but not necessarily be motor-driven, in which case its operation will be controlled by means of the control unit mentioned above.

Various other characteristics emerge from the description provided below with reference to the appended drawings which illustrate the creation of a wheelchair according to the invention, in a form that is preferred but not limiting:

Figure 1:
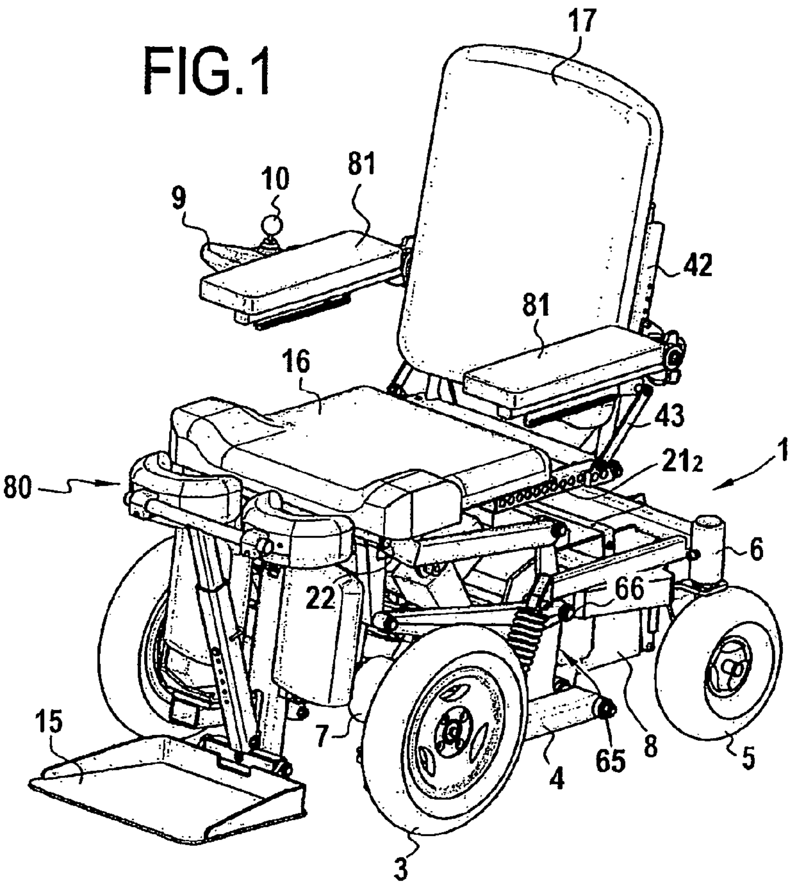
FIG. 1 is a view in three-quarters front perspective of the wheelchair of the invention, in a low, seated or normal position of the seat structure.
Figure 2:
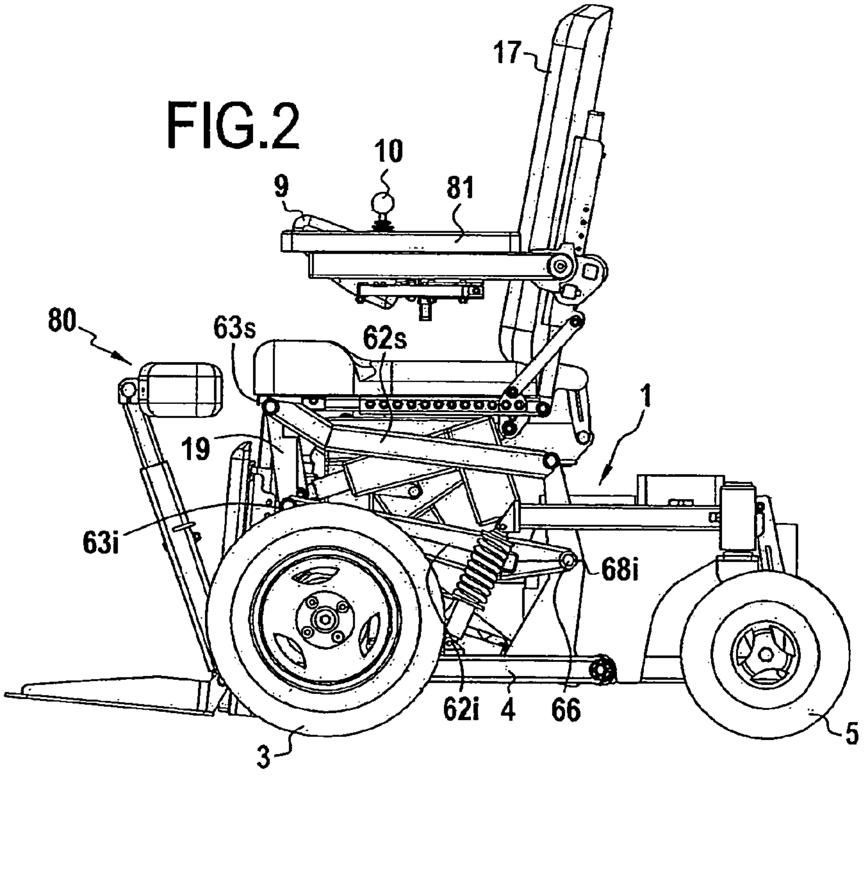
FIG. 2 is a side elevation of the wheelchair according to FIG. 1, in the low seated position.

A wheelchair of the invention, as illustrated in FIGS. 1 to 6, includes a support chassis (1) onto which a seat structure (2) is fitted. According to the form illustrated, the chassis (1) includes two motor-driven front wheels (3), each supported by a suspension arm (4). The chassis (1) also includes two so-called free-moving rear wheels (5), to the extent that they are connected to the chassis (1) by a pivot (6) on a more-or-less vertical axis.

In order to allow changes of direction of the wheelchair during its change of position, each driving wheel(3) is equipped with a geared electric motor (7) powered by a set of batteries (8) and commanded by a control unit (9) fitted with a joystick (10). The control unit (9) is used, by means of the joystick (10), to effect control, synchronized or not, of the motor-driven wheels (4) so as to move the wheelchair of the invention forwards, backwards, to the left, or to the right.

Naturally, it needs to be understood that such a method of implementation of the support chassis (1) is not strictly necessary to the invention and thus that the support chassis could have no motor-driven wheels and could, for example, be designed for manual position changing.

In a conventional manner, the seat structure (2) includes a footrest (15), a seat (16) and a seat back (17). In a preferred manner but one that is not strictly necessary for the creation of a wheelchair of the invention, the seat structure (2) is articulated so as to allow a change in the relative slope of the seat back (17) in relation to the seat (16) and/or a change in the relative slope of the footrest (15) in relation to the seat (16).

To this end and in the embodiment most particularly illustrated in the figures, the seat structure (2) includes a cross-member (19) that is located in the rear region of the wheelchair.

The seat structure also includes a support structure (20) for the seat (16), which is composed of at least one and, according to the illustrated example, of two stringers (21) that are attached to the seat and that, according to the illustrated example, contribute to creating a support frame for the latter. In a preferred manner, the stringers (21) are made in two parts (21-1, 21-2) to allow adjustment of the seat depth according to the height and corpulence of the wheelchair user.

The front parts (21-1) of the two stringers (21) are articulated toward the front on the rear cross-member (19) by means of pivots (22) on more-or-less horizontal axes. The articulated support structure (20) of the seat (16) also includes a motor-driven telescopic actuator (23), composed, for example but not exclusively, of a screw-type electrical actuator. The motor-driven telescopic actuator (23) is then articulated toward the front on the rear cross-member (19) by a pivot (24), also on a horizontal axis and, toward the rear on the stringers (21) and/or, as illustrated, on an element such as a cross-member (25) connected to the front parts (21-1) of the two stringers (21) and constituting the articulated support structure (20) of the seat (16). The motor-driven telescopic actuator (23) is then fixed to the cross-member (25) by means of a pivot (26) on a horizontal axis.

The seat structure (2) also includes an articulated structure (30) that supports the seat back (17). The seat back support structure (30) includes at least one and, according to the illustrated example, two uprights (31) that are attached to the seat back (17) and that are articulated on the rear parts (21-2) of the stringers (21).

According to the illustrated example, the uprights (31) are more particularly connected by a cross-member (32) that is then itself articulated on the stringers (21) of the seat support structure (20), by means of pivots (33) on horizontal axes.

Figure 4:
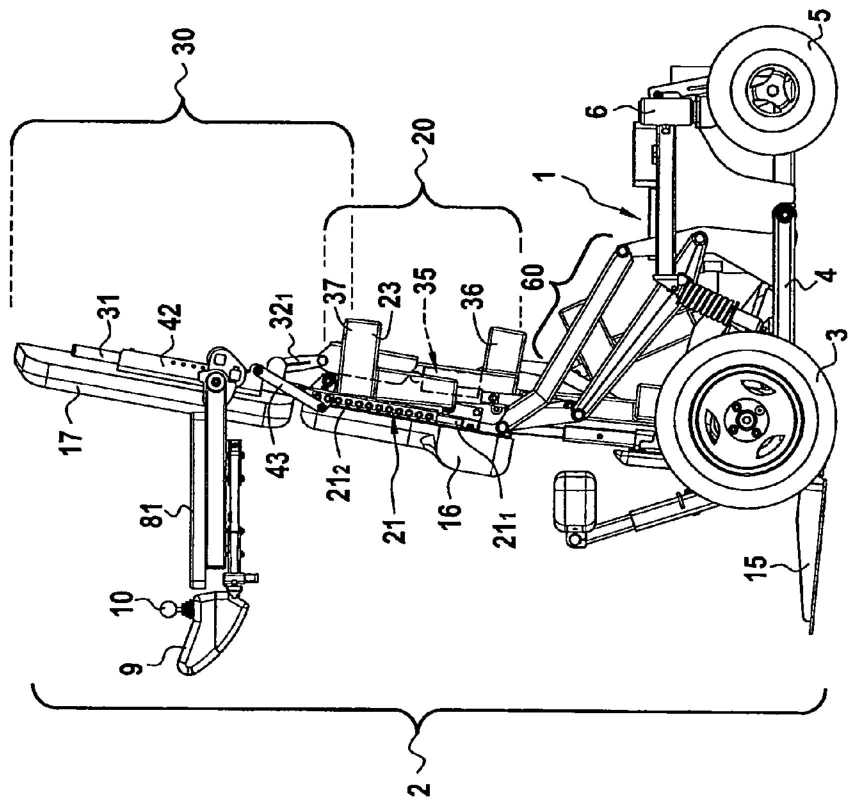
FIG. 4 is a side elevation of the wheelchair, in the position according to FIG. 3.

The articulated structure (30) that supports the seat back (17) also includes a seat back arm (35) positioned under the seat (16), as can be seen more particularly in FIG. 4. This seat back arm (35) is preferably but not necessarily made in two parts, front (36) and rear (37) respectively, which allow continuous adjustment of the length of the seat back arm (35), according in particular to the seat depth. The front part (36) of the seat back arm is articulated on the rear cross-member (19), by means of a pivot on a horizontal axis (39), while the rear part (37) is articulated by a pivot (40) also on an axis that is more-or-less horizontal, on the uprights (31) or an element attached to these last, in this case a finger (32-1), forming an integral part of the cross-member (32).

According to an embodiment that is preferred but not strictly necessary, the length of the seat back arm (35) is adjustable so as to allow adjustment of the relative slope of the seat back (17) in relation to the seat (16). To this end, and according to the illustrated example, the front part (36) of the arm (35) is formed by a telescopic motor-driven actuator, such as a screw-type electrical actuator for example, whose operation is commanded by the control unit (9).

In order to allow continuous and automatic alteration of the length of the dorsal segment, namely the distance between the seat (16) and the seat back (17), during the modification of their relative slope, the seat back (17), in a preferred manner, is fitted onto each upright (31) by means of a slide (42) that is also connected to the seat support structure (20) by a connecting rod (43).

The seat structure (2) also includes an articulated structure (50) to support the footrest (15). The structure (50) then includes at least one and, according to the illustrated example, exactly one leg-support segment (51) that is connected to the footrest (15) and that is articulated on the rear cross-member (19) by means of a pivot (52) on a horizontal axis.

The articulated footrest support structure (50) also includes at least and, according to the illustrated example, exactly one leg-support arm (53) that is articulated, firstly, on the rear cross-member by a pivot (54) on a horizontal axis and, secondly, on the leg-support segment (51) also by means of a pivot (55) also on a horizontal axis.

In a preferred manner, the leg-support arm (53) presents a length that is adjustable, in order to allow modification or adjustment of the relative slope or the slope of the leg-support segment (51) in relation to the seat (16) and therefore, as a consequence, a change in the relative angular position of the footrest (15) in relation to the seat (16).

According to the illustrated example, to this end and in a preferred manner, the arm of the leg support (53) is composed of a motor-driven telescopic actuator, such as a screw-type electrical actuator, controlled by unit 9, as will appear more particularly in what follows.

In order to allow a automatic modification of the distance between the footrest (15) and the seat (16), as may be necessary during the modification of the relative angular position of these two elements, the footrest (15), according to the illustrated example and in a preferred manner, is fitted onto the leg-support segment (51) by means of a carrier (56).

According to the illustrated example, this carrier (56) is then connected, by connecting means (57), to the seat (16) or to the seat support structure (20), so as to allow automatic alteration of the distance between the seat (16) and the footrest (15), during the modification of the relative slope of the leg-support segment (51) in relation to the seat (16).

According to one characteristic of the invention, the wheelchair also includes lifting means (60), interposed between the chassis (1) and the seat structure (2), to allow modification of the height of the seat structure.

The lifting means could be implemented in various ways and, for example, could be composed of a simple actuator, interposed between the chassis (1) and the seat structure (2) and, for example, between the chassis and the rear cross-member (2). However, according to a preferred embodiment of the invention, and in order to provide greater stability and rigidity, the lifting means (60) include at least one articulated assembly that is composed of at least one and, according to the illustrated example, two polygons (61) that are deformable in two parallel vertical planes.

According to the illustrated example, each deformable polygon (61) takes the form of a parallelogram that is deformable, in which the two long sides are formed by two lower (61*i*) and upper (63*s*) segments or arms, which are articulated toward the front on the rear cross-member (19) by pivots (63*i*, 63*s*) on more-or-less horizontal axes. The rear cross-member (19) then forms one short side of the deformable parallelograms (61). It should be noted that, according to the illustrated example, the axis of the pivots (63*s*) of the upper arms (62*s*), is coincident with the axis of the pivots (22) of the articulated seat support structure (20). The segments or arms (62*i*, 62*s*) are also articulated at their rear end on a base (65), attached to the chassis and articulated on the latter by means of a pivot on a more-or-less horizontal axis (66).

According to the illustrated example, the base (65) includes two cross-bars 67, each of which forms the small side of a parallelogram that is deformable (61), being connected to the corresponding segments (62*i*, 62*s*) by pivots (68*i*, 68*s*) on a more-or-less horizontal axis. It will be observed that, according to the illustrated example, the articulation pivots (68*i*) of the lower segments (62*i*) with the corresponding cross-bar (67), have an axis that is coincident with the oscillation axis of the base (65) on the chassis (62).

The elevation means also include a mechanical assistance means (70), interposed between the base (65) and the upper left segment (62*s*) so as to allow a change in the seat height by deformation of the polygons or deformable parallelograms (61). Naturally, according to the invention, the mechanical assistance means (70) could be interposed between the base and another segment of the deformable parallelograms (61).

In a preferred manner, the mechanical assistance means (70) are composed of a motor-driven telescopic actuator, such as a screw-type electrical actuator, controlled by unit 9.

Finally, the wheelchair (2) includes a mechanical assistance means, such as, for example, a screw-type motor-driven electric actuator (73) interposed between the chassis (2) and the base (65), so as to change its relative angle. Thus, the base (65) and the actuator (73) together form the means to incline the whole seat structure, as will appear more particularly in what follows.

The wheelchair, as described previously, operates in the following manner.

To begin with, it needs to be remembered that all of the mechanical assistance devices, composed of:

- the motor-driven telescopic actuator (70) of the elevation means,
- the motor-driven telescopic actuator (23) of the articulated support structure (20) of the seat (16),
- the motor-driven telescopic actuator (36) of the articulated structure (30) that supports the seat back (17),
- the motor-driven telescopic actuator (53) of the articulated structure (50) to support the footrest (15),
- and the motor-driven telescopic actuator (73) of the means to incline the whole seat structure (2), are all commanded by the control unit (9).

Figure 7:
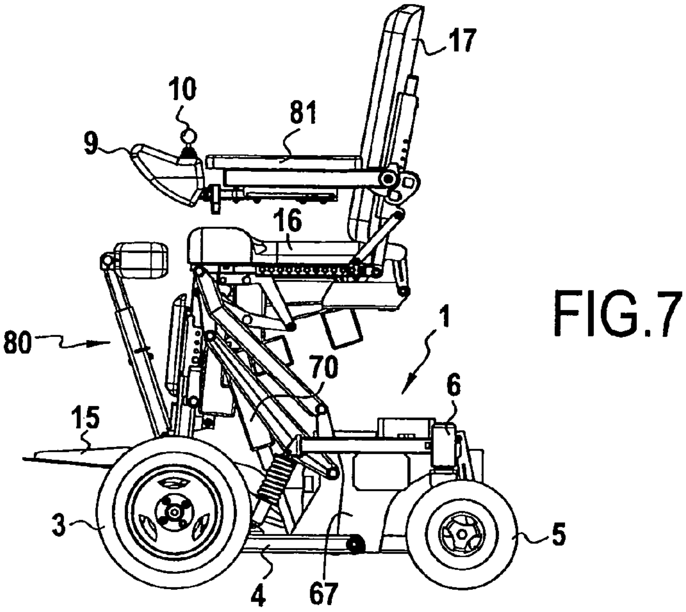
FIG. 7 is an elevation, similar to FIG. 2, of the wheelchair in a high seated position of the seat structure.

In a preferred manner, the control unit (9) is therefore designed so as to provide individual control over each of these actuators. Thus, the user of the wheelchair of the invention is able to control a raise/lower movement of the whole seat structure by controlling the so-called "lift" motor-driven telescopic actuator (70) that causes a change in the height of the seat (16). It is therefore possible for the wheelchair user to control passage from the low, seated or normal position as illustrated in FIG. 1, to the high seated position as illustrated in FIG. 7.

Figure 8:
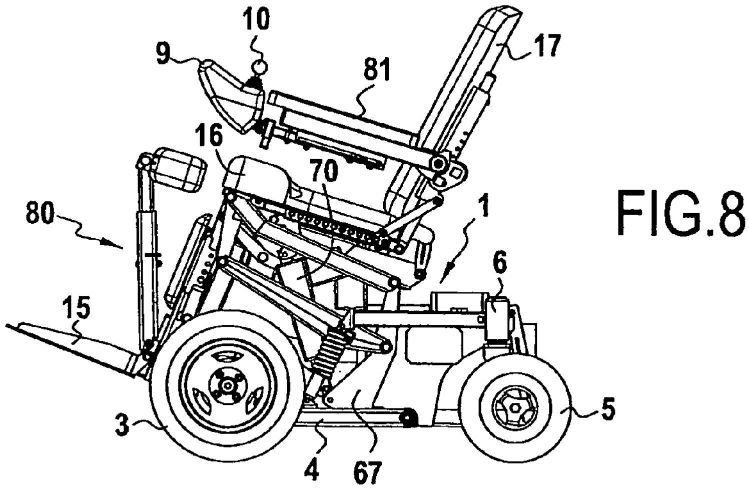
FIG. 8 is an elevation, similar to FIG. 2, of the wheelchair in a so-called relaxation position of the seat structure.

Likewise, then, independently of the height of the seat structure or of the seat (16), the user is also able, by means of unit 9, to control the so-called "trim" motor-driven telescopic actuator (73), and thus change the general slope or trim of the seat structure in order, for example, to incline toward the rear and to adopt a relaxation position as illustrated in FIG. 8.

It should be noted that this movement for modification of the trim has no effect whatsoever on the general configuration of the seat structure.

Figure 9:
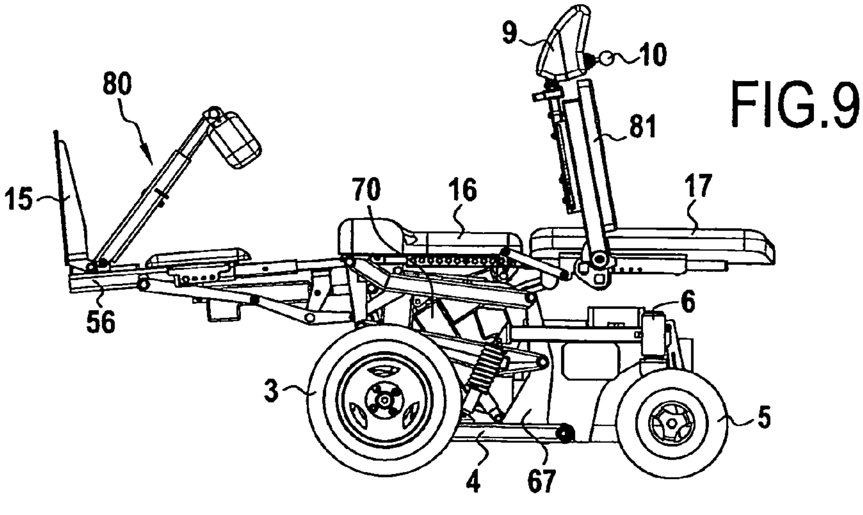
FIG. 9 is an elevation, similar to FIG. 2, of the wheelchair in an extended position of the seat structure.

Using this control, the user is also able, via the control unit (9) of the actuators (36, 53), to change the relative slope of the seat back in relation to the seat, as well as the slope of the footrest in relation to the seat, in such a manner that he (or she) is able to place the wheelchair of the invention in different configurations, such as semi-extended or indeed completely extended, as shown in FIG. 9, a configuration in which the seat back (17), the seat (16) and the footrest (15) are then all more-or-less aligned on a horizontal plane.

In a preferred embodiment, the control unit (9) is designed to allow automatic passage to the extended position by coordinated control of the seat back actuator (36) and the footrest actuator (53).

In this extended configuration, the user also has access to the raise/lower function and can, by controlling the lift actuator (70) for example, choose to place the seat structure in the lying down configuration at the desired height, so as to allow transfer of the wheelchair user onto an examination table or indeed into a bed.

Furthermore, in this configuration, the user also has access to the general slope function of the whole seat structure and is able, for example, to incline it toward the rear, where it then adopts the lying-down position. This prone position inclined toward the rear, known as "forward-tilted", illustrated in FIGS. 5 and 6, can be useful for the respiratory physiotherapy technique called "back clapping".

Figure 3:
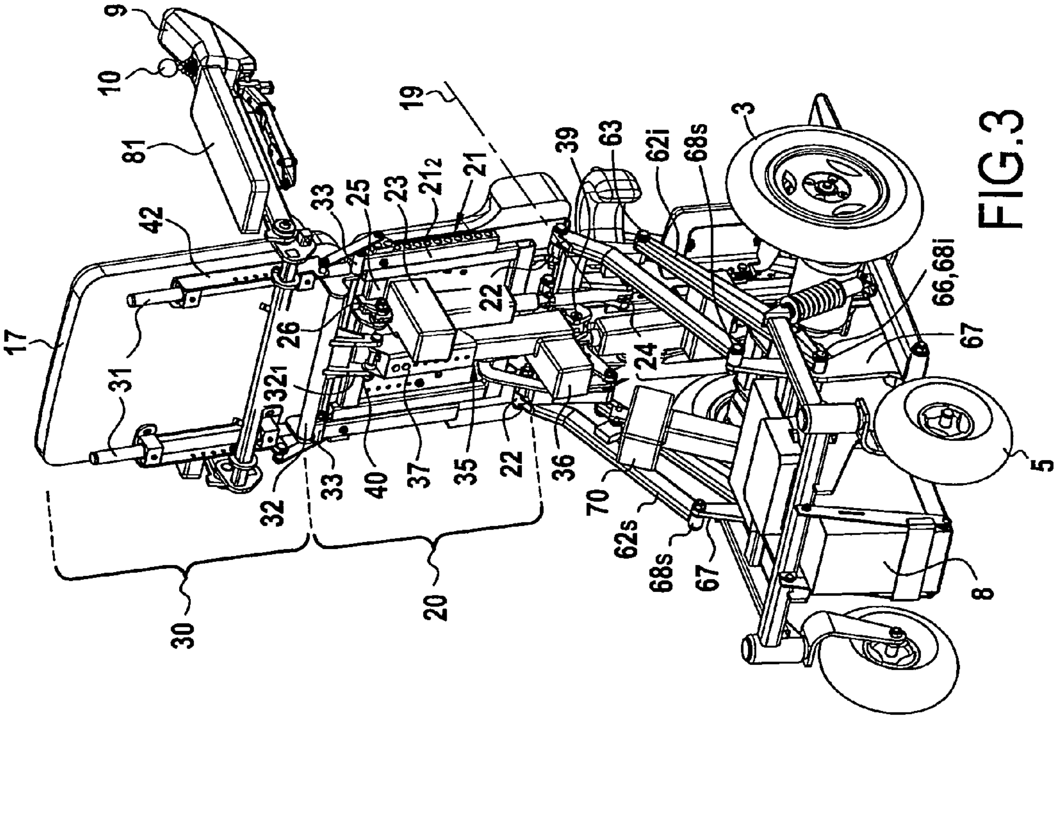
FIG. 3 is a view in three-quarters rear perspective of the wheelchair according to FIG. 1, in a virtualization position of the seat structure.
Figure 5:
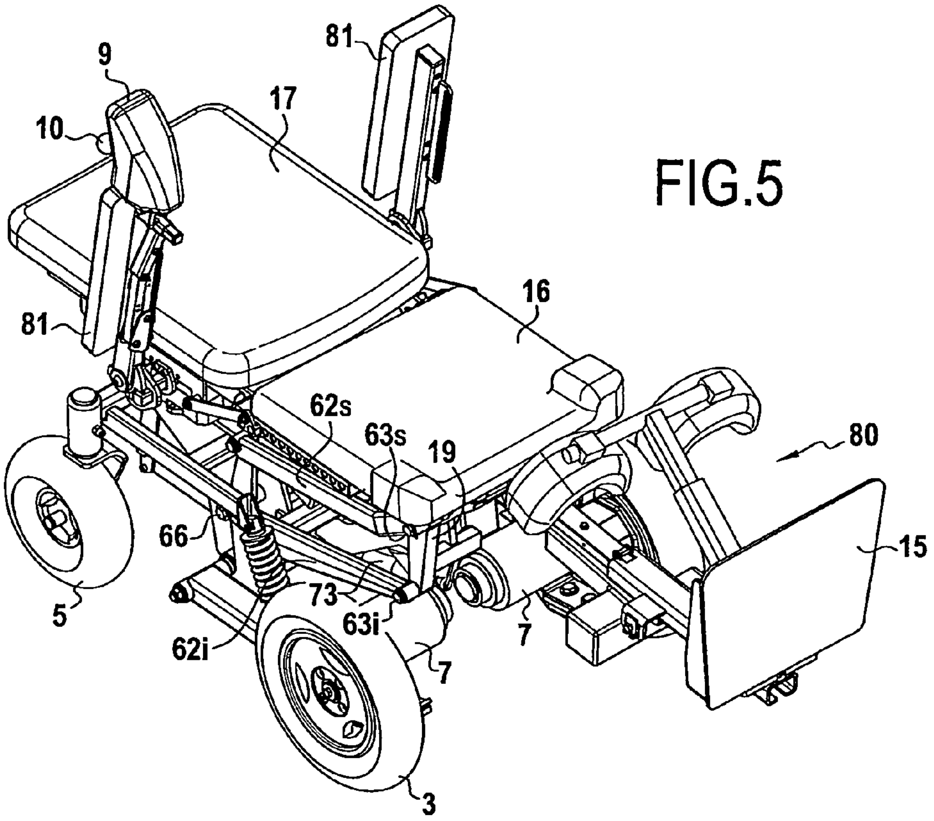
FIG. 5 is a view in three-quarters front perspective of the wheelchair according to FIG. 1, in an extended position inclined toward the rear of the seat structure.
Figure 6:
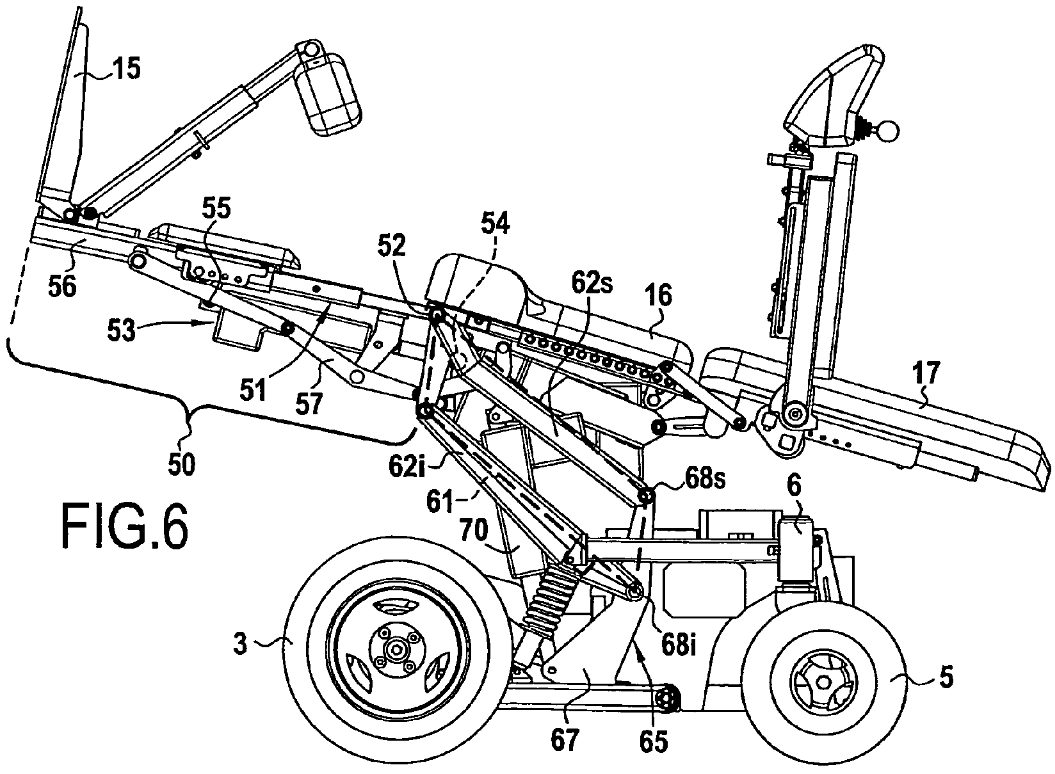
FIG. 6 is a side elevation of the wheelchair, in the position according to FIG. 5.

According to the invention, the wheelchair is able, from the normal seated position FIG. 1, just by controlling the motor-driven actuator (23), to pass to a virtualization position (4). In fact, given the relation that exists between the articulated structures to support the seat (16), the seat back (17) and the footrest (15), just controlling the motor-driven telescopic actuator (23) allows one to pass from the seated position to the virtualization position, as illustrated in FIGS. 3 and 4.

The operation of a single actuator, called the virtualization actuator (23), to achieve this virtualization of the seat structure, has the advantage of affording a high level of comfort and convenience, and a feeling of security, to the extent that this movement can be effected automatically by the control unit, with no jerking and with great fluidity.

Naturally, the control unit (9) will then be programmed so as to ensure that, before triggering of the virtualization movement, the seat structure (2) is located at a height that is sufficient to prevent any risk of stopping the movement by contact of the footrest with the ground.

Moreover, it should be noted that, in a virtualization position, the elevation function, performed by the lift actuator (70), remains accessible. Likewise, the general slope function of the whole seat structure, in a virtualization position, is also accessible by controlling the seat actuator (73) in such a manner that it is possible to choose a position that is slightly inclined toward the rear, helping to give better stability to the wheelchair and to provide a feeling of security to a wheelchair user who no longer has use of his or her lower limbs.

In order to provide a very high degree of flexibility and ease of use, the control unit (9) is also designed, by coordinated operation of the virtualization actuators (23) of the seat back (36) and the leg support (53), to achieve automatic passage from virtualization position of FIG. 4 to the extended position of FIG. 9, and vice versa, possibly with the option of stopping in an intermediate position. This movement is then effected while preserving the alignment of the footrest, the seat and the seat back more-or-less in a single plane.

It should be noted that in order to guarantee security of use in that virtualization position, the wheelchair will be fitted with thoracic retention resources (not illustrated), composed for example of a strap or harness, as well as retention means at the bottom (80) formed, according to the illustrated example, by kneepads that apply pressure to the knees, in order to prevent any sagging or slippage of the wheelchair user in the virtualization position.

Likewise, in a manner that is conventional to a wheelchair for handicapped people, the wheelchair of the invention includes two armrests (81) attached to the seat back structure (20). According to the illustrated example, the control unit (9) is fitted to the right-hand armrest (81).

According to the illustrated example, and as described previously, the seat back (17) is connected to the seat support structure (20) by a connecting rod (43). However such a rigid connecting method is not strictly necessary to create a wheelchair according to the invention.

Figure 10:
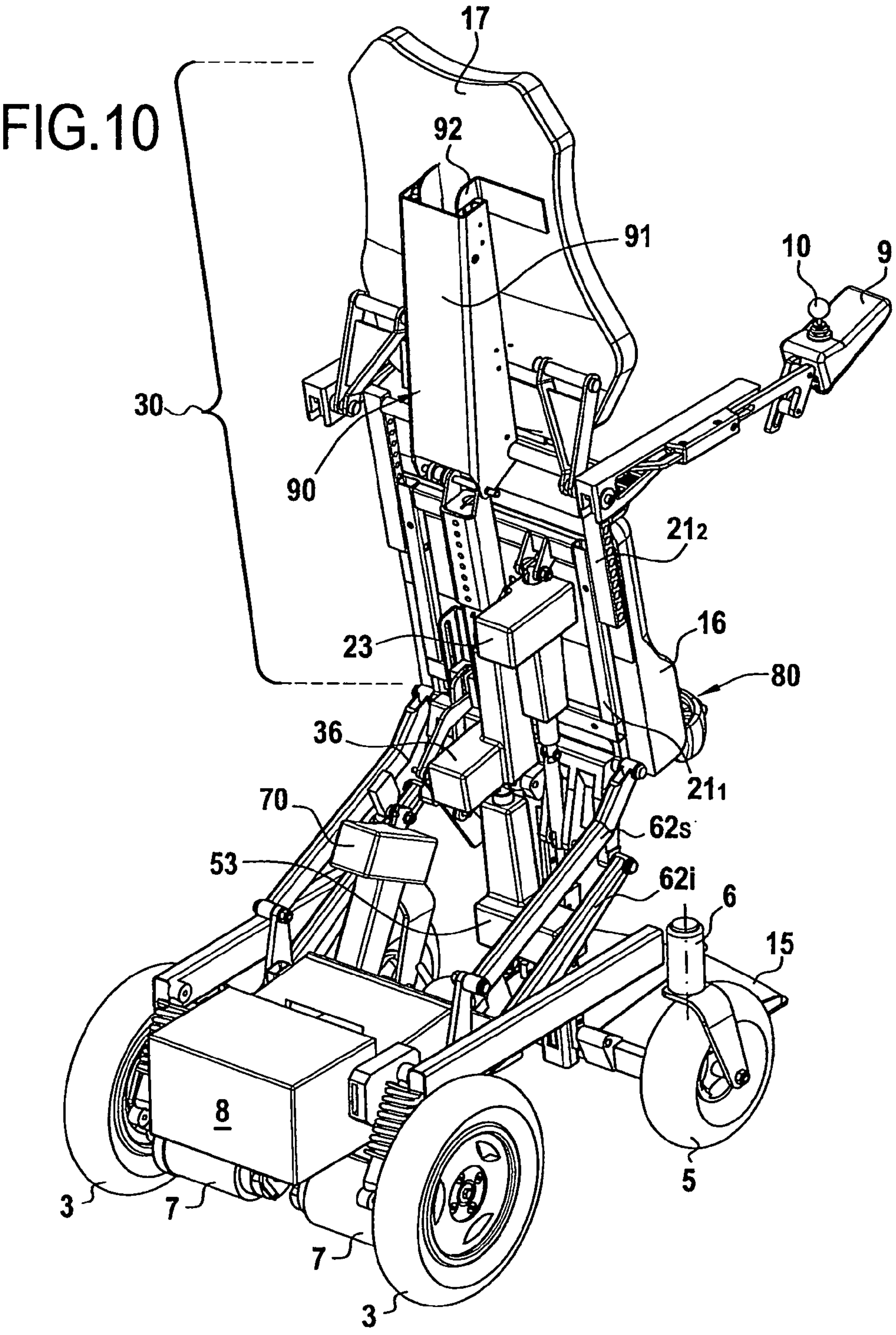
FIG. 10 is a perspective view similar to FIG. 3 showing another embodiment of a wheelchair according to the invention.

Thus, FIG. 10 presents another embodiment of a multi-position wheelchair for handicapped people according to the invention that differs from the embodiment as described in relation to FIGS. 1 to 9, in that the seat back (17) is supported by a single upright (90) articulated on the support structure (20) of the seat (16). The seat back (17) is then connected to a slide that is mobile on the upright (91). The seat back is also connected to the seat support structure by a flexible belt (not shown) guided by a system of pulleys, (also not shown), so as to achieve an increase in the distance between the seat back (17) and the seat (16) during passage to a virtualization position.

The embodiment illustrated in FIG. 10 also differs in that it is the rear wheels (3) that motor-driven while the front wheels (5) are free-moving. The motor-driven wheelchair illustrated in FIG. 10 can therefore be described as a propulsion wheelchair or pushed wheelchair, in comparison with the wheelchair illustrated in FIG. 1 to 9, which can be described as a traction wheelchair or a pulled wheelchair. In the context of the embodiment illustrated in FIG. 10, the placement of the motors (7) at the rear allows the mass to be moved backwards, and the stability of the wheelchair to be improved in the virtualization positions in particular.

The invention claimed is:

1. A wheelchair for handicapped people or people of reduced mobility, with:

a support chassis (1), a seat structure (2) that includes at least:

a footrest (15), a seat (16), and a seat back (17), and lifting means (60) interposed between the chassis (1) and the seat structure (2), allowing a height change of the seat structure, wherein said wheelchair includes means to incline the seat structure (2) that are interposed between the chassis and the seat structure, and lifting means and that include at least:

a base (65) that is attached to the chassis (1) and that oscillates around a more-or-less horizontal axis on which the lifting means are fitted, and an actuator (73) that is interposed between the base (65) and the chassis (1) and that is designed, by rotation of the base (65), to allow a slope change of the whole seat structure (2), independently of its configuration, and wherein the lifting means include at least:

an articulated assembly with at least one polygon that is deformable (61) in a vertical plane, interposed between the seat structure and the base, which then forms one side of the deformable polygon, and a mechanical assistance means (70) designed, by deformation of the polygon (61), to allow the height change of the seat structure (2), the seat structure being articulated and including:

support structures for the seat back (17), the seat (16) and the footrest (15), that are articulated in order to allow a slope change of the seat back in relation to the seat and a slope change of the footrest in relation to the seat, and at least one mechanical assistance means (23, 36, 53) designed to ensure an inclination change of the seat back in relation to the seat and a change of the footrest in relation to the seat, said seat structure further including a cross-member (19) that that is located in the rear region of the wheelchair and that forms one side of the deformable polygon (61) of the lifting means (60), and wherein:

the articulated structure (20) to support the seat includes at least:

a stringer (21) that is attached to the seat (16) and that is articulated toward the front on the rear cross-member (19), and a motor-driven telescopic actuator (23) that is articulated toward the front on the rear cross-member (19) and, to the rear on the stringer or an element (25) attached to the stringer, and that forms a mechanical assistance means for verticalization of the seat structure (2), the articulated structure (30) that supports the seat back (17) includes at least:

an upright (31) that is attached to the seat back and that is articulated on the rear end of the stringer (21) or on an element attached to the stringer, and a seat back arm (35) that is articulated on the rear cross-member (19) and on the upright (31) or an element (32) attached to the upright, and the articulated structure (50) to support the footrest (15) includes at least:

a leg-support segment (51) that is attached to the footrest and that is articulated on the rear cross-member (19), a leg-support arm (53) that is articulated firstly on the rear cross-member (19) and secondly on the leg-support segment (51).

2. A wheelchair according to claim 1, wherein the articulated assembly (60) includes at least two polygons (61) that are deformable in two parallel vertical planes.

3. A wheelchair according to claim 1, wherein each deformable polygon (61) takes the form of a quadrilateral that is deformable, in which two sides are formed by two articulated segments connecting the chassis to the seat structure.

4. A wheelchair according to claim 3, wherein the deformable quadrilateral (61) takes the form of a parallelogram.

5. A wheelchair according to claim 1, wherein the actuator (73) of the means to incline the whole seat structure (2) is motor-driven.

6. A wheelchair according to claim 1, wherein the articulated seat structure (2) and the mechanical assistance means (23) are designed so as to allow the passage of the seat structure into a verticalization position in which the footrest (15), the seat (16) and the seat back (17) are placed in extension in relation to each other in a more-or-less vertical plane.

7. A wheelchair according to claim 1, wherein the seat back arm (35) includes a rear segment (36) formed by a motor-driven actuator (36) that constitutes a mechanical assistance means for modifying the relative slope of the seat back (17) in relation to the seat (16).

8. A wheelchair according to claim 1, wherein the leg-support arm is formed by a motor-driven actuator (53) that constitutes a mechanical assistance means for modifying the relative slope of the footrest (15) in relation to the seat (16).

9. A wheelchair according to claim 1, further comprising a control unit (9) that provides control over the motor-driven actuators and that is designed:

firstly, to automatically move the seat structure (2) from a normal position either to a verticalized position in which the footrest (15), the seat (16) and the seat back (17) are aligned in a more-or-less vertical plane, or to an extended position, in which the footrest, the seat and the seat back are aligned in a more-or-less horizontal plane, and, secondly, to allow a change in the elevation of the seat structure in a semi-automatic manner.

10. A wheelchair according to claim 1, wherein the footrest (15) is fitted onto the leg-support segment by means of a carrier (56), so as to be mobile in translation in relation to the rear cross-member (19).

11. A wheelchair according to claim 1, wherein the seat back (17) is fitted onto the upright of the seat back by means of a slide (42) so as to be mobile in translation in relation to the seat (16).

12. A wheelchair according to claim 1, wherein the chassis (1) is fitted with at least three wheels (3, 5).

13. A wheelchair according to claim 12, wherein at least one wheel (3) is motor-driven.

* * * * *